July 7, 1964
L. M. GERMAIN
3,140,477
AMPLITUDE DENSITY PROBABILITY COMPUTER
Filed Oct. 1, 1958
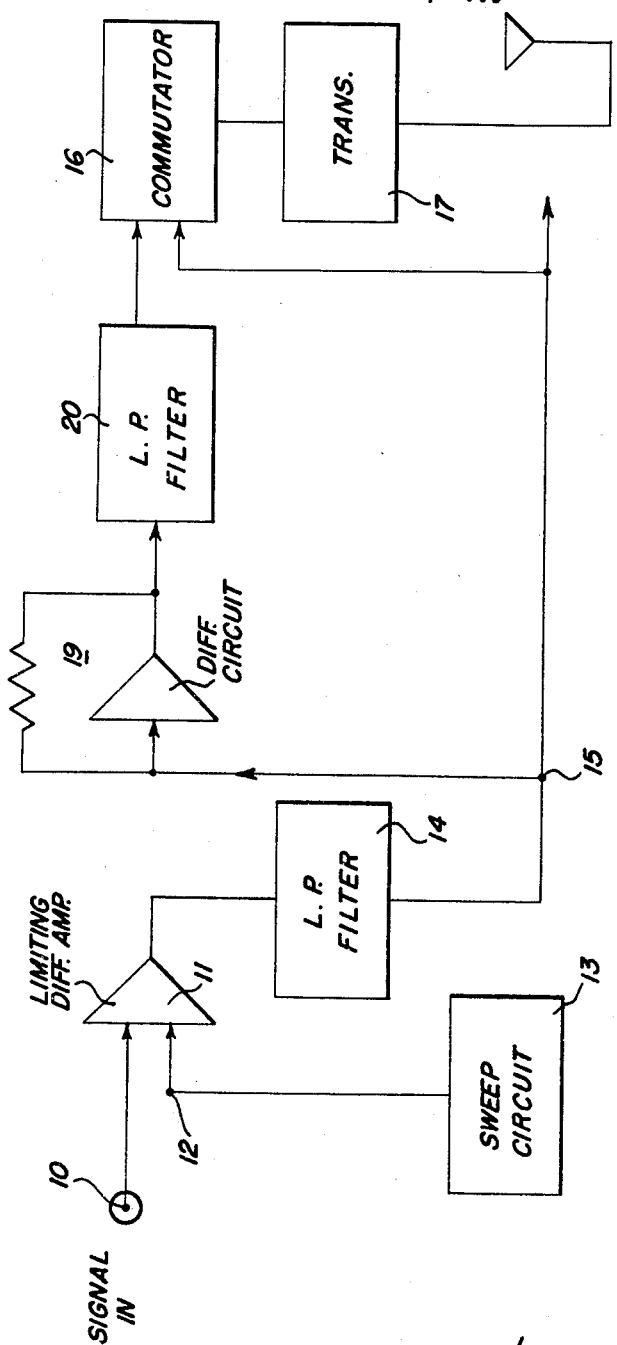
INVENTOR
*Lloyd M. Germain*
BY *Hurvitz & Rose*
ATTORNEYS

United States Patent Office 3,140,477
Patented July 7, 1964

3,140,477
AMPLITUDE DENSITY PROBABILITY COMPUTER
Lloyd M. Germain, New York, N.Y., assignor, by mesne assignments, to Electro-Mechanical Research, Inc., Sarasota, Fla., a corporation of Connecticut
Filed Oct. 1, 1958, Ser. No. 764,567
10 Claims. (Cl. 340—345)

The present invention relates generally to systems for computing amplitude probability functions, and more particularly to systems for computing such functions by means of simple circuitry in a single channel, by means of operations involving continuous functions.

This application relates to an improvement of an application, concurrently filed in the names of Lowenstein and Harries, entitled Amplitude Distribution Telemetering, Serial Number 764,568, now Patent No. 3,122,732, and assigned to the same assignee as the present application.

Briefly describing the present invention, a rapidly varying random signal is supplied, which is to be statistically analyzed for amplitude probabilities. This signal is supplied to a difference amplifier, followed by a clipper or a limiter of one polarity. The combination may be denominated a limiting difference amplifier, and performs the functions of supplying an output signal of fixed amplitude whenever one of two signals exceeds the other.

To the limiting differential amplifier is supplied a comparison signal, preferably in the form of a sawtooth voltage, which slowly scans over a range of values which the random signal may have, or which is of interest in respect thereto. We denote the sawtooth voltage as V. Instantaneously, the limiting differential amplifier is arranged to provide fixed output when, and only when, the random signal attains V. The saw tooth voltage varies slowly, so that for each instantaneous value of V a sufficiently long statistical sample of the rapidly varying random signal is taken.

The output of the limiting differential amplifier is smoothed over a sampling time. The output of the smoother provides a plot of the percentage of time each instantaneous value of the voltage level V is not exceeded. Inherently, this supplies information concerning the percentage of time for which the voltage level V is exceeded. To determine amplitude probability density function the output of the integrator is differentiated, in an analog differentiating circuit. The output of the latter circuit may be further smoothed, if desired.

It is, accordingly an object of the invention to provide a system of computing amplitude distribution data.

It is a further object of the invention to provide a system of computing amplitude distribution functions and amplitude probability density functions.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the invention.

Referring now more specifically to the accompanying drawings, the reference numeral 10 denotes a source of rapidly varying random signal, deriving from a transducer in a missile, or the like, and forming part of a telemetering system.

The signal terminal 10 is connected to one input of a difference amplifier 11. To the remaining input terminal 12, is supplied a slowly varying saw tooth sweep voltage, deriving from a sweep circuit 13. The difference amplifier 11 is supplied with a limiter in cascade, or is so constructed and arranged as to limit as by employing switching transistors in the amplifier.

The output of the difference amplifier 11 is arranged to consist of pulses of uniform amplitude occurring whenever, and only whenever, the random signal exceeds the instantaneous value of V.

If the input signal is rapid and random and the voltage V varies slowly the output pulses may be integrated, or smoothed, in a low pass filter 14, to provide on a lead 15 an integration or summation of the percentage of time for which the input signal does not exceed the value of V. This implies that integration time is equal to a time during which V is almost constant. To provide examples, V may require 5 seconds to complete an excursion, while the integrator may have a time constant of about 1/5 second.

The lead 15 may proceed to one contact of a commutator 16, so that the integrated signal may be sampled, and the samples transmitted via a transmitter 17.

The lead 15 may also be coupled to the input of an analog differentiating circuit 19. The output of the latter is smoothed in an integrator 20, in the form of a low pass filter, having approximately the same time constant as the integrator 14. The output of the integrator 20 is then an amplitude probability density function. The integrators 14 and 20 may be, in practice, low pass filters, so that their outputs may consist of slowly varying D.C. voltage. The integrator 20 may be connected to an input of commutator 16.

In practice only one of the functions developed by the present system may be transmitted or both may be transmitted, as desirable in a given telemetering problem.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A computer comprising a source of rapidly randomly amplitude varying signal to be analyzed for amplitude distribution, a source of slowly varying sawtooth comparison voltage, the rate of rise of said sawtooth comparison voltage being sufficiently slow to permit statistical sampling of amplitudes of said random signal, a limiting difference amplifier having two input terminals and an output terminal, means connecting said source of random signal and said source of sawtooth comparison voltage, respectively, to said two input terminals, an integrating circuit connected to said output terminal, said integrating circuit having a time constant far smaller than the total time of rise of said sawtooth voltage, said sawtooth voltage having a range of amplitudes at least co-extensive with amplitudes of interest in said randomly amplitude varying signal and a differentiating circuit coupled in cascade with said integrating circuit, and a further integrating circuit coupled in cascade with said differentiating circuit.

2. The combination according to claim 1 wherein is provided a commutator and a radio transmitter in cascade, and means for connecting said further integrating circuit to an input terminal of said commutator.

3. A computer for computing amplitude distribution of a relatively rapidly randomly amplitude varying signal, comprising a source of relatively slowly varying sawtooth comparison signal, said sawtooth comparison signal having a range of amplitude at least co-extensive with amplitudes of interest in said relatively rapidly randomly amplitude varying signal, the rate of rise of said sawtooth comparison signal being sufficiently slow to permit statistical sampling of the amplitudes of said relatively rapidly randomly amplitude varying signal, a limiting difference amplifier responsive to said relatively rapidly randomly amplitude varying signal and to said sawtooth comparison signal for generating constant amplitude difference signals only during occurrence of a predetermined amplitude relation between said relatively rapidly randomly amplitude varying signal and said sawtooth comparison signal, means responsive to the signal deriving from said amplifier for integrating said constant amplitude difference signals over times for which said sawtooth comparison signal is substantially constant while said relatively rapidly randomly amplitude varying signal varies through a range of amplitudes and a differentiating circuit coupled in cascade with said means for integrating.

4. The combination according to claim 3 wherein is further provided an integrating circuit coupled in cascade with said differentiating circuit.

5. In a system for computing an amplitude probability density function of a randomly varying function, means responsive to said function for computing a time function having a predetermined fixed value only while the amplitude of said randomly varying function at least equals the amplitude of a uniformly varying comparison signal, first means responsive to said means for computing for integrating said time function to provide an amplitude distribution function, means responsive to said first integrating means for differentiating said amplitude distribution function to provide a derived function, and second means responsive to said differentiating means for integrating said derived function, each of said means for integrating having a time constant small relative to the total duration of said comparison signal.

6. In a system for computing an amplitude distribution function of a rapidly randomly varying signal, means responsive to said signal for computing a time function having a fixed amplitude only while said randomly varying signal at least equals the amplitude of a slowly varying comparison signal, means responsive to said means for computing for integrating said time function, said means for integrating having a time constant small relative to the total duration of said comparison signal, and means responsive to said means for integrating, for differentiating said integrated time function.

7. In a system for computing an amplitude probability density function of a randomly varying function, means responsive to said function for computing a time function having a predetermined fixed value only while the amplitude of said randomly varying function at least equals the amplitude of a uniformly varying comparison signal, first means responsive to said means for computing for integrating said time function to provide an amplitude distribution function, means responsive to said first integrating means for differentiating said amplitude distribution function to provide a derived function, and second means responsive to said differentiating means for integrating said derived function, each of said means for integrating having a time constant small relative to the total duration of said comparison signal, a commutator connected in cascade with said second means for integrating, and a signal transmission system coupled in cascade with said commutator.

8. In a system for computing an amplitude probability density function of a randomly varying function, means responsive to said function for computing a time function having a predetermined fixed value only while the amplitude of said randomly varying function at least equals the amplitude of a uniformly varying comparison signal, first means responsive to said means for computing for integrating said time function to provide an amplitude distribution function, means responsive to said first integrating means for differentiating said amplitude distribution function to provide a derived function, and second means responsive to said differentiating means for integrating said derived function, each of said means for integrating having a time constant small relative to the total duration of said comparison signal, and means responsive to said second integrating means for transmitting sampled values of an integrated time function provided by said second means for integrating.

9. In a system for computing an amplitude distribution function, a source of rapidly amplitude varying signal, means responsive to said rapidly amplitude varying signal for generating a fixed response only while said rapidly amplitude varying signal at least equals a comparison signal in amplitude, means responsive to said generating means for integrating said fixed responses over a sufficient time to provide a value of said amplitude distribution function representative of the amplitude of said comparison signal and means for differentiating coupled in cascade with said means for integrating, said means for differentiating deriving a signal commensurate with the amplitude probability function of said rapidly varying signal.

10. In a system for computing an amplitude probability density function, a source of rapidly amplitude varying signal, means responsive to said rapidly amplitude varying signal for generating a fixed response only while the amplitude of said rapidly varying signal bears a predetermined relation to a reference amplitude, means responsive to said generating means for integrating said fixed responses to provide an amplitude distribution function, means responsive to said means for integrating for differentiating said amplitude distribution function to provide a differentiated function, and second means responsive to said differentiating means for integrating said differentiated function to provide said amplitude probabilty density function.

References Cited in the file of this patent
UNITED STATES PATENTS

| | | |
|---|---|---|
| 2,537,843 | Meacham | Jan. 9, 1951 |
| 2,704,323 | Leu-Liang Wu | Mar. 15, 1955 |
| 2,760,189 | McCoy et al. | Aug. 21, 1956 |
| 2,854,570 | Broverman | Sept. 30, 1958 |
| 2,868,975 | Harris et al. | Jan. 13, 1959 |
| 2,927,279 | Vaniz | Mar. 1, 1960 |
| 2,942,112 | Hearn | June 21, 1960 |
| 2,958,822 | Rogers | Nov. 1, 1960 |